(12) United States Patent
Smillie et al.

(10) Patent No.: US 8,399,101 B2
(45) Date of Patent: Mar. 19, 2013

(54) TOUGHENED POLY(HYDROXYALKANOIC ACID) COMPOSITIONS

(75) Inventors: Benjamin Andrew Smillie, Kingston (CA); Julius Uradnisheck, Glen Mills, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 1277 days.

(21) Appl. No.: 11/523,276

(22) Filed: Sep. 19, 2006

(65) Prior Publication Data
US 2008/0071008 A1 Mar. 20, 2008

(51) Int. Cl.
*C08L 51/04* (2006.01)
*C08L 67/04* (2006.01)
*B32B 27/36* (2006.01)
*B65D 65/40* (2006.01)

(52) U.S. Cl. ........ 428/446; 428/457; 428/480; 428/483; 525/64; 525/65; 525/69

(58) Field of Classification Search ............... 525/69, 525/64, 65; 428/446, 457, 480, 483
See application file for complete search history.

(56) References Cited

U.S. PATENT DOCUMENTS

| | | | |
|---|---|---|---|
| 3,264,272 A | 8/1966 | Rees | |
| 4,187,358 A | 2/1980 | Kyo | |
| 4,753,980 A | 6/1988 | Deyrup | |
| 4,912,167 A | 3/1990 | Deyrup | |
| 5,063,259 A * | 11/1991 | Wanat et al. | 523/201 |
| 5,883,199 A | 3/1999 | McCarthy | |
| 6,235,825 B1 | 5/2001 | Yoshida | |
| 6,323,308 B1 | 11/2001 | Kobayashi | |
| 6,713,175 B1 | 3/2004 | Terada | |
| 6,756,331 B2 | 6/2004 | Kasemura | |
| 6,943,214 B2 | 9/2005 | Flexman | |
| 6,960,374 B1 | 11/2005 | Terada | |
| 7,078,368 B2 | 7/2006 | Laney | |
| 7,283,304 B2 * | 10/2007 | Murata et al. | 359/599 |
| 2003/0031864 A1 * | 2/2003 | Clikeman et al. | 428/343 |
| 2003/0045625 A1 * | 3/2003 | Sharma et al. | 524/502 |
| 2003/0161572 A1 * | 8/2003 | Johnck et al. | 385/14 |
| 2004/0014838 A1 * | 1/2004 | Tollhupp | 523/160 |
| 2004/0024122 A1 * | 2/2004 | Chang et al. | 525/64 |
| 2004/0242803 A1 * | 12/2004 | Ohme et al. | 525/400 |
| 2005/0131120 A1 | 6/2005 | Flexman | |
| 2005/0151296 A1 | 7/2005 | Obuchi | |
| 2006/0142438 A1 * | 6/2006 | Ishii et al. | 524/100 |
| 2006/0142505 A1 | 6/2006 | Umemoto et al. | |
| 2008/0057090 A1 * | 3/2008 | McEntire et al. | 424/401 |

FOREIGN PATENT DOCUMENTS

| | | |
|---|---|---|
| EP | 0953583 B1 | 11/1999 |
| EP | 0980894 A1 | 2/2000 |
| EP | 1 657 280 A1 | 5/2006 |
| EP | 1691376 * | 8/2006 |
| EP | 1 785 453 A1 | 5/2007 |
| EP | 1 826 241 A1 | 8/2007 |
| WO | WO 03014224 A1 | 2/2003 |
| WO | WO 03082980 A1 | 10/2003 |
| WO | WO 2004101642 A1 | 11/2004 |
| WO | 2005/123831 A1 | 12/2005 |
| WO | 2006/064846 A1 | 6/2006 |

OTHER PUBLICATIONS

Abstract for WO 2006/064846.
Abstract for WO 2005/123831.
PCT Partial International Search for International Application No. PCT/US2007/020341, dated Apr. 23, 2008.

* cited by examiner

*Primary Examiner* — Jeffrey Mullis

(57) ABSTRACT

Disclosed is a toughened poly(hydroxyalkanoic acid) resin composition comprising poly(hydroxyalkanoic acid) and an impact modifier comprising a core/shell polymer that does not comprise a vinyl aromatic comonomer, having a refractive index not greater than 1.5; wherein the core comprises elastomer and the shell comprises non-elastomeric polymer. Also disclosed are packaging materials and packaged products comprising the composition.

9 Claims, No Drawings

TOUGHENED POLY(HYDROXYALKANOIC ACID) COMPOSITIONS

The invention relates to toughened poly(hydroxyalkanoic acid) composition and product therewith.

BACKGROUND OF THE INVENTION

Poly(hydroxyalkanoic acid) (PHA) polymers such as poly (lactic acid) (PLA) can be polymerized from renewable sources rather than petroleum and are compostable. They have a broad range of industrial and biomedical applications as films. For example, JP patent application H9-316310 discloses a poly(lactic acid) resin composition comprising PLA and modified olefin compounds. Examples of those modified olefin compounds are ethylene-glycidyl methacrylate copolymers grafted with polystyrene, poly(dimethyl methacrylate), etc., and copolymers of ethylene and alpha-olefins grafted with maleic anhydride and maleimide. Toughened PHA compositions are also disclosed in, for example, US patent application 2005/0131120 and 2006/0142505; U.S. Pat. Nos. 5,883,199, 6,323,308, 6,417,294, 6,713,175, 6,756,331, 6,960,374, and 7,078,368; and EP0980894 A1 and EP093583B1.

However, physical limitations such as brittleness prevent easy sheet casting and subsequent trimming of the sheet into thermoformed articles. In addition to the difficulties of managing the brittle sheet through the sheet making process, articles subsequently thermoformed from the sheet may lack sufficient toughness for many applications. Some toughened PHA compositions have undesirably poor clarity. Accordingly, it is desirable to obtain a toughened composition to be easily melt-processed into a variety of articles with good toughness, preferably while maintaining acceptable clarity.

SUMMARY OF THE INVENTION

The invention provides a toughened poly(hydroxyalkanoic acid) composition comprising or prepared from a poly(hydroxyalkanoic acid) and an impact modifier wherein the poly (hydroxyalkanoic acid) is present in the composition from about 90 to about 99.8%; the impact modifier is present in the composition from about 0.2 to about 10% and comprises a core/shell polymer that does not comprise a vinyl aromatic comonomer, and has a refractive index not greater than 1.5; the core comprises one or more elastomers, preferably comprising polyalkyl acrylate, optionally cross-linked; the shell comprises non-elastomeric polymer, preferably polymethyl methacrylate, optionally containing functional groups selected from the group consisting of epoxy, carboxylic acid, and amine; and the weight % of the poly(hydroxyalkanoic acid) or the impact modifier is based on the total weight of the poly(hydroxyalkanoic acid) and the impact modifier This invention also provides packaging materials or containers comprising the toughened composition.

DETAILED DESCRIPTION OF THE INVENTION

All references disclosed herein are incorporated by reference.

Copolymer means polymers containing two or more different comonomers including dipolymer and terpolymer, polymers containing only two and three different comonomers respectively.

Compostable polymers are those that are degradable under composting conditions. They break down under the action of organisms (annelids) and microorganisms (bacteria, fungi, algae), achieve total mineralization (conversion into carbon dioxide, methane, water, inorganic compounds or biomass under aerobic conditions) at a high rate and are compatible with the composting process.

Biodegradable polymers are those that are capable of undergoing decomposition into carbon dioxide, methane, water, inorganic compounds or biomass in which the predominant mechanism is the enzymatic action of microorganisms that can be measured by standardized tests, in a specified time, reflecting available disposal conditions.

Renewable polymers are those that comprise or are prepared from raw or starting materials that are or can be replenished sooner than within a few years (unlike petroleum which requires thousands or millions of years), such as by fermentation and other processes that convert biological materials into feedstock or into the final renewable polymer.

Poly(hydroxyalkanoic acid) polymers are usually biodegradable or compostable polymers. A number of these are also available from processing renewable resources, such as production by bacterial fermentation processes or isolated from plant matter that include corn, sweet potatoes, and the like.

PHA compositions include polymers prepared from polymerization of a hydroxyalkanoic acid having from 2 to 7 (or more) carbon atoms, including the polymer comprising 6-hydroxyhexanoic acid, also known as polycaprolactone (PCL), and polymers comprising 3-hydroxyhexanoic acid, 4-hydroxyhexanoic acid and 3-hydroxyheptanoic acid. Of note are poly(hydroxyalkanoic acid) polymers comprising hydroxyalkanoic acids having five or fewer carbon atoms, for example, polymers comprising glycolic acid, lactic acid, 3-hydroxypropionate, 2-hydroxybutyrate, 3-hydroxybutyrate, 4-hydroxybutyrate, 3-hydroxyvalerate, 4-hydroxyvalerate and 5-hydroxyvalerate. Notable polymers include poly (glycolic acid) (PGA), poly(lactic acid) (PLA) and poly (hydroxybutyrate) (PHB). PHA compositions also include blends of two or more PHA polymers, such as a blend of PHB and PCL.

Polyhydroxyalkanoic acids can be produced by bulk polymerization. A PHA may be synthesized through the dehydration-polycondensation of the hydroxyalkanoic acid. A PHA may also be synthesized through the dealcoholization-polycondensation of an alkyl ester of hydroxyalkanoic acid or by ring-opening polymerization of a cyclic derivative such as the corresponding lactone or cyclic dimeric ester. The bulk polymerization is usually carried out using either a continuous process or a batch process. Japanese Patent application 03-502115A discloses a process wherein bulk polymerization for cyclic esters is carried out in a twin-screw extruder. JP07-26001A discloses a process for the polymerization for biodegradable polymers, wherein a bimolecular cyclic ester of hydroxycarboxylic acid and one or more lactones are continuously fed to a continuous reaction apparatus having a static mixer for ring-opening polymerization. JP07-53684A discloses a process for the continuous polymerization for aliphatic polyesters, wherein a cyclic dimer of hydroxycarboxylic acid is fed together with a catalyst to an initial polymerization step, and then continuously fed to a subsequent polymerization step built up of a multiple screw kneader. U.S. Pat. Nos. 2,668,162 and 3,297,033 disclose batch processes.

PHA polymers also include copolymers comprising more than one hydroxyalkanoic acid, such as polyhydroxy-butyrate-valerate (PHB/V) copolymers and copolymers of glycolic acid and lactic acid (PGA/LA). Copolymers can be prepared by catalyzed copolymerization of a hydroxyalkanoic acid or derivative with one or more cyclic esters and/or dimeric cyclic esters. Such comonomers include glycolide (1,4-dioxane-2,5-dione), the dimeric cyclic ester of glycolic acid; lactide (3,6-dimethyl-1,4-dioxane-2,5-dione); α,α-dimethyl-β-propiolactone, the cyclic ester of 2,2-dimethyl-3-hydroxypropanoic acid; β-butyrolactone, the cyclic ester of 3-hydroxybutyric acid; δ-valerolactone, the cyclic ester of 5-hydroxy-pentanoic acid; ε-caprolactone, the cyclic ester of 6-hydroxyhexanoic acid, and the lactones of its methyl substituted derivatives such as 2-methyl-6-hydroxyhexanoic acid, 3-methyl-6-hydroxyhexanoic acid, 4-methyl-6-hydroxyhexanoic acid, 3,3,5-trimethyl-6-hydroxyhexanoic acid, etc.; the cyclic ester of 12-hydroxydodecanoic acid; 2-p-dioxanone; and the cyclic ester of 2-(2-hydroxyethyl)-glycolic acid.

PHA compositions also include copolymers of one or more hydroxyalkanoic acid monomers or derivatives with other comonomers, including aliphatic and aromatic diacid and diol monomers such as succinic acid, adipic acid, and terephthalic acid and ethylene glycol, 1,3-propanediol, and 1,4-butanediol. Around 100 different monomers have been incorporated into PHA copolymers.

PHA polymers and copolymers may also be made by living organisms or isolated from plant matter. Numerous microorganisms have the ability to accumulate intracellular reserves of PHA polymers. For example, PHB/V has been produced by fermentation of the bacterium *Ralstonia eutropha*. Fermentation and recovery processes for other PHA types have also been developed using a range of bacteria including *Azotobacter, Alcaligenes latus, Comamonas testosterone* and genetically engineered *E. coli* and *Klebsiella*. U.S. Pat. No. 6,323,010 discloses a number of PHA copolymers prepared from genetically modified organisms.

"Poly(hydroxyalkanoic acid)" refers to a polymer or composition comprising any homopolymer or copolymer comprising a hydroxyalkanoic acid and mixtures thereof, such as those homopolymers, copolymers and blends listed above. Likewise, when a specific hydroxyalkanoic acid is used in such a term, such as poly(glycolic acid), poly(lactic acid) or poly(hydroxybutyrate), the term includes homopolymers, copolymers or blends comprising the hydroxyalkanoic acid used in the term.

Glycolic acid is derived from sugar cane. Poly(glycolic acid) can be synthesized by the ring-opening polymerization of glycolide and is sometimes referred to as poly-glycolide.

PLA includes poly(lactic acid) homopolymers and copolymers of lactic acid and other monomers containing at least 50 mole % of repeat units derived from lactic acid or its derivatives and mixtures thereof having a number average molecular weight of 3,000 to 1,000,000, 10,000 to 700,000, or 20,000 to 600,000. PLA may contain at least 70 mole % of repeat units derived from (e.g. made by) lactic acid or its derivatives. The poly(lactic acid) homopolymers and copolymers can be derived from d-lactic acid, l-lactic acid, or a mixture thereof. A mixture of two or more poly(lactic acid) polymers can be used. PLA may be prepared by the catalyzed ring-opening polymerization of the dimeric cyclic ester of lactic acid, which is referred to as "lactide." As a result, PLA is also referred to as "polylactide."

Copolymers of lactic acid are typically prepared by catalyzed copolymerization of lactic acid, lactide or another lactic acid derivative with one or more cyclic esters and/or dimeric cyclic esters as described above.

The composition may comprise PHA in an amount ranging from a lower limit of about 90 weight % to an upper limit of about 97, 99, 99.5, or 99.8 weight %, based on the total amount of PHA and impact modifier used.

The impact modifier or toughener can be present in the composition in an amount ranging from a lower limit of about 0.2, 0.5, 1 or 3 weight % to an upper limit of about 10 weight %.

Core-shell used herein denotes a compound comprising a soft core comprising elastomer, elastomeric polymer, or rubber (these terms are used interchangeably), surrounded by a shell comprising a rigid polymer. Core-shell polymers used herein are generally described in "Core-Shell Impact Modifiers" [Carlos A. Cruz-Ramos, *Polymer Blends*, Vol. 2: *Performance*, 137-75 (D. R. Paul & C. B. Bucknall eds., 2000)].

The low-modulus interior of the core-shell polymer compound comprises elastomer. An elastomer is a compound with a glass transition temperature ($T_g$) of less than about 20° C. Preferably the $T_g$ of the elastomer is less than about 0° C., and more preferably the $T_g$ is less than about −20° C. Furthermore, the low-modulus interior is substantially noncrystalline, i.e., less than about 10% of the low-modulus interior is crystalline. The core preferably comprises polyalkyl acrylate, such as polybutyl acrylate, and may be optionally cross-linked. The core may further comprise butadiene as a comonomer.

The shell comprises a rigid polymer, preferably with $T_g$ much higher than that of the core, which is chemically grafted onto the core. The shell of the core-shell polymer compound has two functions. First, the shell prevents the low-modulus interior of each core-shell polymer compound from adhering to the low-modulus interior of other core-shell polymer compounds. Second, when the core-shell polymer compound is dispersed in the PHA, the shell physically binds the PHA to the low-modulus interior of the core-shell polymer compound.

The shell of the core-shell polymer compound can comprise any non-elastomeric polymer, for example, polymethyl methacrylate, optionally containing functional groups such as epoxy, carboxylic acid, or amine. The non-elastomeric polymers are generally prepared from olefinic monomers by free radical polymerization.

Core-shell polymer compounds can be prepared by any of the methods known to one of ordinary skill in the art, for example, the methods described in U.S. Pat. Nos. 3,808,180 and 4,180,529. For example, a core-shell polymer compound can be prepared by emulsion polymerization in water or other suitable fluid medium with suitable initiators, first feeding in and polymerizing a monomer or set of monomers to form the core. Feeding in a second monomer or set of monomers then forms the shell. Though the predominant monomers contain a single polymerizable vinyl group, smaller quantities of monomers with multiple vinyl groups, such as butadiene, may optionally be used for preparation of core and/or shell. Emulsion polymerization produces core-shell polymer compounds of a well-defined size with a narrow size distribution, wherein each core-shell polymer compound is individually polymerized and optionally cross-linked during the synthesis process. The core-shell polymer compositions can retain their well-defined size and narrow size distribution even after dispersion in the PHA, although they may be somewhat swollen by interaction with the PHA. Preferred core-shell modifiers have maximum diameter of less than 0.5 μm, such as 0.2 to 0.3 μm, or no greater than 0.2 μm.

A core-shell polymer may also be made up of multiple layers, prepared by a multi-stage, sequential polymerization technique of the type described in U.S. Pat. No. 4,180,529. Each successive stage is polymerized in the presence of the previously polymerized stages. Thus, each layer is polymerized as a layer on top of the immediately preceding stage. In one embodiment, the first stage of the polymerization produces a non-elastomer polymer, the second stage produces an elastomer polymer, and the third stage produces a non-elastomer polymer. In another embodiment, the first stage of the polymerization produces an elastomeric polymer, the second stage produces a non-elastomeric polymer, the third stage produces an elastomeric polymer, and the fourth stage produces a non-elastomeric polymer. In other embodiments, this process may be extended to five or more stages.

To provide a toughened PHA composition that retains good transparency (low haze), the components of the core-shell polymer compound can have refractive indices that match well with the refractive index (RI) of the PHA. For example, transparent PLA has RI of 1.46, so the core-shell polymer desirably has RI not greater than 1.5. The low-modulus interior of the core-shell polymer compound can comprise any elastomeric polymer or copolymer that does not comprise an aromatic vinyl comonomer (such as styrene), preferably comprising polyalkyl acrylate (for example polybutyl acrylate). Polybutyl acrylate rubber has RI of 1.47 and can be suited for the core. The elastomeric polymers are optionally cross-linked.

In a preferred embodiment, the core of the core-shell polymer comprises about 50 to about 90 weight percent of the core-shell polymer, the percentages being based on the total weight of the core-shell polymer.

Core-shell polymer compounds can be obtained commercially, for example, Paraloid® EXL-2330 (with a core prepared from butyl acrylate monomer), Paraloid® EXL-2314 (epoxy functional polymer, with a core prepared from butyl acrylate monomer), and Paraloid® KM-365 (with a core prepared from butyl acrylate monomer) from Rohm and Haas (Philadelphia, Pa.). Other suitable core-shell polymer compounds include those with butyl acrylate cores and polymethyl methacrylate shells, for example IM808A available from LG Chemicals (LG Twin Towers, 20, Yeouido-doing, Yeongdeungpo-gu, Seoul 150-721, South Korea), and those with acrylic rubber cores, for example, Metablend® W 330A available from Mitsubishi Rayon America Inc., 747 Third Avenue, New York, N.Y.

The toughened PHA composition can further comprise optional additives including plasticizers, stabilizers, antioxidants, ultraviolet ray absorbers, hydrolytic stabilizers, antistatic agents, dyes or pigments, fillers, fire-retardants, lubricants, reinforcing agents such as glass fiber and flakes, processing aids, antiblock agents, release agents, or combinations of two or more thereof.

These additives may be present in the compositions in quantities up to about 40% of the composition, or 0.01 to 15%, 0.01 to 10%, or 0.01 to 5 weight %, of the total composition. For example, the compositions may contain from about 0.5 to about 5 weight % plasticizer; about 0.1 to about 5 weight % antioxidants and stabilizers; about 3 to about 40 weight % fillers; about 5 to about 40 weight % reinforcing agents; about 0.5 to about 10 weight % nanocomposite reinforcing agents; and/or about 1 to about 40 weight % flame retardants. Examples of suitable fillers include glass fibers and minerals such as precipitated $CaCO_3$, talc, wollastonite, or combinations of two or more thereof. Fillers and reinforcing agents, when used, can be of small size. For example, a film may be less than 50 μm in thickness and accordingly, a solid additive desirably has sizes less than that. Fillers and reinforcing agents may reduce transparency of the film when present.

The composition can be prepared by melt-blending the PLA and the impact modifier and, optionally, other materials (e.g., additives) until they are homogeneously dispersed to the naked eye and do not delaminate upon film formation. The blend may be obtained by combining the component materials using any melt-mixing method known in the art. For example: 1) the component materials may be mixed to homogeneity using a melt-mixer such as a single or twin-screw extruder, blender, kneader, Banbury mixer, roll mixer, etc. to give a resin composition; or 2) a portion of the component materials can be mixed in a melt-mixer, and the rest of the component materials subsequently added and further melt-mixed until homogeneous.

The compositions may be formed into cast films or sheets by extrusion through a slit die and calendering the resultant flat sheet. Film and sheet are used to describe generally planar articles having one relatively small dimension and two relatively large dimensions. Sheets are considered to be thicker than films, but as used herein, either term is used interchangeably to describe a film and/or a sheet, without limitation to any specific thickness. For example, but not limitation, the sheets are useful to prepare packaging material and packages.

The sheets may comprise a single layer of the toughened PHA composition (a monolayer sheet). Alternatively, multilayer films or sheets comprise a layer of the toughened PHA composition and at least one additional layer comprising a different material.

Any film-grade polymeric resin or material known in the art of packaging can be employed to prepare additional layers in a multilayer structure. In many cases, the multilayer polymeric sheet may involve at least three categorical layers including, but not limited to, an outermost structural or abuse layer, an inner or interior barrier layer, and an innermost layer making contact with and compatible with the intended contents of the package and capable of forming any needed seals. Other layers may also be present to serve as adhesive layers to help bond these layers together.

The outermost structural or abuse layer may be prepared from the toughened PHA composition. Additional structure layers may include oriented polyester or oriented polypropylene, but can also include oriented polyamide (nylon). This outer layer may be unaffected by the sealing temperatures used to make a package, since the package is sealed through the entire thickness of the multilayer structure. This layer optionally may have a seal initiation temperature such that it allows for tacking down a flap or lap seal. The thickness of this layer can be selected to control the stiffness of the packaging film, and may range from about 10 to about 60 μm, or about 50 μm. The structure layer can be formed, for example, by reverse printing using rotogravure methods.

The inner layer can include one or more barrier layers to reduce the permeation rate through the layer by agents such as water, oxygen, carbon dioxide, electromagnetic radiation such as ultraviolet radiation, and methanol that potentially can affect the product inside the pouch. Such barrier layers can be applied by various methods such as solvent or aqueous coating, vacuum deposition, chemical vapor deposition, coextrusion, extrusion coating, or combinations of two or more thereof.

Barrier layers can comprise, for example, metallized polypropylene or polyethylene teraphthalate, ethylene vinyl alcohol, polyvinyl alcohol, polyvinylidene chloride, aluminum foil, silicon oxides (SiOx), aluminum oxide, aromatic nylon, blends or composites of the same as well as related copolymers thereof. Barrier layer thickness may depend on the sensitivity of the product and the desired shelf life.

The structure and barrier layers can be combined to comprise several layers of polymers that provide effective barriers to moisture and oxygen and bulk mechanical properties suitable for processing and/or packaging the product, such as clarity, toughness and puncture-resistance.

The innermost layer of the package is the sealant. The sealant is selected to have minimum effect on taste or color of the contents, to be unaffected by the product, and to withstand sealing conditions (such as liquid droplets, grease, dust, or the like). The sealant can be a polymeric layer or coating that can be bonded to itself (sealed) at temperatures substantially below the melting temperature of the outermost layer so that the outermost layer's appearance will not be affected by the sealing process and will not stick to the jaws of the sealing bar. Typical sealants used in multilayer packaging films useful in this invention include ethylene polymers, such as low density polyethylene, linear low density polyethylene, metallocene polyethylene, EVA, copolymers of ethylene and methyl acrylate or (meth)acrylic acid, or ionomers of copolymers of ethylene and (meth)acrylic acid. Sealants can also include polyvinylidene chloride, polyester copolymers, or polypropylene copolymers. Sealants can be made peelable by, for example, combinations of polymers, tackifiers and fillers. Peelable sealants are available from E. I. du Pont de Nemours and Company (DuPont), Wilmington, Del. Sealant layers are typically from about 25 to about 100 μm thick.

Polyamides (nylon) suitable for use include aliphatic polyamides, amorphous polyamides, or a mixture thereof. "Aliphatic polyamides" as the term is used herein can refer to aliphatic polyamides, aliphatic copolyamides, and blends or mixtures of these. Preferred aliphatic polyamides for use in the invention are polyamide 6, polyamide 6.66, blends and mixtures thereof. Polyamides 6.66 are commercially available from BASF AG. The film may further comprise other polyamides such as those described in U.S. Pat. Nos. 5,408,000; 4,174,358; 3,393,210; 2,512,606; 2,312,966 and 2,241,322.

The sheet may also comprise partially aromatic polyamides. Some suitable partially aromatic copolyamides are the amorphous nylon resins 6-I/6-T commercially available from DuPont for example.

Polyolefins suitable for use are selected from polypropylene or polyethylene homopolymers and copolymers comprising ethylene or propylene. Polyethylenes can be prepared by a variety of methods, including well-known Ziegler-Natta catalyst polymerization (see for example U.S. Pat. Nos. 3,645,992 and 4,076,698), metallocene catalyst polymerization (see e.g., U.S. Pat. Nos. 5,198,401 and 5,405,922) and by free radical polymerization. Polypropylene polymers include propylene homopolymers, impact modified polypropylene and copolymers of propylene and alpha-olefins. Because polyolefins are so well known, the description of which is omitted for the interest of brevity.

The film can comprise layers comprising ethylene copolymers such as ethylene vinyl acetate and ethylene methyl acrylate and ethylene acid polymers such as ethylene (meth) acrylic acid.

Anhydride or acid-modified ethylene and propylene homo- and co-polymers can be used as extrudable adhesive layers (also known as "tie" layers) to improve bonding of layers of polymers together when the polymers do not adhere well to each other, thus improving the layer-to-layer adhesion in a multilayer structure. The compositions of the tie layers may be determined according to the compositions of the adjoining layers that need to be bonded in a multilayer structure. One skilled in the polymer art can select the appropriate tie layer based on the other materials used in the structure. Various coextrudable tie layer compositions are commercially available from DuPont, for example. Other tie layers include solvent-applied polyurethane compositions.

Polyethylene vinyl alcohol having from about 20 to about 50 mole % ethylene can be suitable for use herein. Suitable polyethylene vinyl alcohol polymers are commercially available from Kuraray or from Nippon Gohsei, for example.

Polyvinylidene chloride can be obtained commercially from Dow Chemical, for example.

Surface modifiers such as polyglycerol esters for antifogging properties, surface radicalization such as from corona or flame treatment for improved adhesion and printability, silica microspheres or silicones for reduced coefficient of friction, long-chain aliphatic amines for antistatic properties, and primers for improved ink adhesion can also be used in the sheets.

A multilayer film or sheet can be prepared by coextrusion as follows: granulates of the various components are melted in separate extruders. The molten polymers are passed through a mixing block that joins the separate polymer melt streams into one melt stream containing multiple layers of the various components. The melt stream flows into a die or set of dies to form layers of molten polymers that are processed as a multilayer flow. The stream of layered molten polymers is cooled rapidly on a quench drum to form a layered structure.

A film or sheet can also be made by (co)extrusion followed by lamination onto one or more other layers. Other suitable converting techniques are, for example, blown film (co)extrusion and (co)extrusion coating.

Of note is a film or sheet comprising a layer of the toughened PHA composition and a heat seal layer.

The sheet may also be laminated to a substrate such as foil, paper or nonwoven fibrous material to provide a packaging material. Lamination involves laying down a molten curtain of an adhesive composition between the substrate and the PHA film moving at high speeds (about 30 to 300 m/minute or about 90 to 240 m/minute) as they come into contact with a cold (chill) roll. The melt curtain is formed by extruding the adhesive composition through a flat die. Solution-based adhesive compositions may also be used to adhere the film to the substrate.

Films and sheets can be used to prepare packaging materials such as containers, pouches and lidding, balloons, labels, tamper-evident bands, or engineering articles such as filaments, tapes and straps.

Packages and packaged products can comprise the compositions, films, and/or structures disclosed above. The packages may comprise the films wrapped around the packaged product and optionally comprising other packaging materials. Packages may also be formed of one or more portions of film bonded together, for example by heat sealing. Such packages may have the form of pouches, packets, vacuum skin packaging and the like. Pouches are formed from film web stock by cutting and heat-sealing separate pieces of web stock and/or by a combination of folding and heat-sealing with cutting. Tubular films may be formed into pouches by sealing across the tube (transverse seal). Other packages include containers with lidding films prepared from the toughened PHA compositions as described herein.

Toughened PHA compositions can also be provided in other forms, including shaped articles, molded articles, etc. The containers and packaging materials can be of various shapes including trays, cups, caps, or lids prepared from sheets by vacuum or pressure forming; shapes prepared by deep drawing an unstretched sheet (i.e. thermoforming); shapes prepared by extrusion blow molding or biaxial stretching blowing parisons (injection stretch blow molding) and the like; profile extruded articles; shapes prepared by injection molding, compression molding or other molding processes; and shapes prepared by folding a sheet and heat sealing its edges such as a gable-topped carton. Other containers comprising the toughened PHA composition may be in the form of squeezable tubes, pouches or bottles; components of containers (such as a cap, cap liner, lid, screw top, or other closure); bags or pouches within a rigid container that dispense liquids such as wine, medical fluids, baby formula; and blister packs. A packaging material in one of these forms exhibits the same toughened properties as those described for the films.

A film or sheet comprising the toughened PHA composition could be further processed into a shaped article that could be included in packaging. For example, the film or sheet could be thermoformed. Thermoformed articles may have a shape in which a sheet of material forms a concave surface such as a tray, cup, can, bucket, tub, box or bowl. The thermoformed article may also comprise a film with a cup-like depression formed therein. The thermoformed film or sheet may be shaped to match the shape of the material to be packaged therein. Flexible films when thermoformed as described retain some flexibility in the resulting shaped article. Thicker thermoformed sheets may provide semi-rigid or rigid articles. Thermoformed articles may be combined with additional elements, such as a generally planar film sealed to the thermoformed article that serves as a lid (a lidding film).

The packaging materials, such as films or sheets, may also be processed further by, for example, printing, embossing and/or coloring to provide a packaging material to provide information to the consumer about the product therein and/or to provide a pleasing appearance of the package.

Products that can be packaged include food and non-food items including beverages (e.g., carbonated beverages, orange juice, apple juice, grape juice, other fruit juices and milk), solid foods (e.g., meats, cheese, fish, poultry, nuts, coffee, applesauce or other sauces, stews, dried fruit, food paste, soups and soup concentrates and other edible items), spices, condiments (e.g., ketchup, mustard, and mayonnaise), pet food, cosmetics, personal care products (e.g., toothpaste, shaving foam, soaps, shampoos, lotions and the like), pharmaceuticals, fragrances, electronic components, industrial chemicals or household chemicals (e.g., laundry detergent, fabric softener), agrochemicals, medical devices and equipment, medicinal liquids, fuels, and biological substances.

Of note is a package comprising a thermoformed container such as a tray, cup, or bowl comprising the toughened PHA composition, and a lidding film comprising a PHA composition, including toughened PHA.

Such containers may be used to package products such as yogurts, puddings, custards, gelatins, fruit sauces (for example, applesauce), cheese spreads and dips, meats, frozen or refrigerated meals, dry foods (e.g., noodles and seasoning for reconstitution with water) or dry snacks (e.g., cookies, chips and the like).

The films may also be slit into narrow tapes and drawn further to provide slit film fibers for use as degradable sutures.

The following Examples are merely illustrative, and are not to be construed as limiting the scope of the invention described and/or claimed herein.

EXAMPLES

PLA-1 is a PLA with a melting point of about 150° C. available commercially as NatureWorks® 2002DL.
IM-1 is a core-shell polymer compound with a methacrylate-butadiene-styrene core and a shell comprising polymethyl methacrylate, available as Paraloid® EXL 8619.
IM-2 is a core-shell polymer compound with a core comprising butyl acrylate rubber and a shell comprising polymethyl methacrylate, available as Paraloid® EXL 2330.

Preparation of Compositions

Using a 25 mm 38/1 L/D ZSK-25 World Lab twin-screw extruder manufactured by Krupp Werner & Pfleiderer (W&P) melt blends of PLA-1 and the impact modifier were prepared. The compositions of the melt blends are shown below. In each case PLA-1 and impact modifier were co-fed using K-tron loss in weight feeders into the throat of the twin-screw extruder. In all cases the PLA-1 was predried overnight in a desiccant hopper with a set-point temperature of 40 to 45° C. The melt blend exiting the extruder through a two-hole die was water quenched and then the quenched strand was cut into pellets using a Scheer pelletizer. Typical extruder operating conditions for the 25 mm twin-screw extruder are shown in Table 1.

Comparative Example C1: 100% PLA-1.
Comparative Example C2: 95% PLA-1 and 5% IM-1.
Example 3: 95% PLA-1 and 5% IM-2.

TABLE 1

| Example 3 | Set Point | Actual |
| --- | --- | --- |
| Temperature Control Zone 1 (Barrel Zones 2 and 3) | 215° C. | 215 |
| Temperature Control Zone 2 (Barrel Zones 4 and 5) | 215° C. | 215 |
| Temperature Control Zone 3 (Barrel Zones 6 and 7) | 200° C. | 199 |
| Temperature Control Zone 4 (Barrel Zones 8 and 9) | 200° C. | 199 |
| Temperature Control Zone 5 (Die) | 220° C. | 220 |
| Screw Speed (rpm) | | 205 |
| Torque (%) | | 87 |
| Die Pressure (kPa) | | 2800 |
| Melt Temperature (° C.) | | 223 |
| Total Throughput (g/min) | | 263 |
| Sheer Cutter Set-point | | 17 |
| Vacuum Zone 4 (mm Hg) | | 30 |

After drying overnight at 40° C. in a desiccant hopper drier, the pellets were used to cast 19-cm wide amorphous sheets. The sheets were cast using a 31.75 mm diameter 30/1 L/D single screw extruder fitted with a 3/1 compression ratio, single-flight screw with 5 L/D of a melt mixing section. There was a 60/80/60 square mesh screen on the breaker plate at the end of the extruder barrel. The extruder die was a 203-mm wide coat hanger type flat film die with a 0.76 mm die gap. The extruder was built by Wayne Machine (100 Furler St. Totowa N.J. 07512-1896). The molten polymer film exiting from the die drawn down to nominally 0.76 mm thick as it was cast onto a 203-mm wide by 203-mm diameter double-shell spiral baffle casting roll fitted with controlled temperature cooling water. The casting roll and die were built by Killion Extruders (Davis Standard, 200 Commerce Road, Cedar Grove, N.J. 07009). Extruder conditions are provided in Table 2.

TABLE 2

| Extruder Conditions | Set point | C1 actual | C2 actual | Ex 3 actual |
| --- | --- | --- | --- | --- |
| Barrel Zone 1° C. | 215 | 215 | 218 | 215 |
| Barrel Zone 2° C. | 215 | 215 | 216 | 215 |
| Barrel Zone 3° C. | 215 | 216 | 216 | 215 |
| Barrel Zone 4° C. | 215 | 221 | 219 | 220 |
| Filter Flange ° C. | 215 | 215 | 215 | 215 |
| Adapter ° C. | 215 | 215 | 216 | 215 |
| Die End ° C. | 215 | 215 | 216 | 215 |
| Feed Block ° C. | 215 | 215 | 215 | 215 |
| Flat Die ° C. | 215 | 215 | 215 | 215 |
| Filter Melt ° C. | | 213 | 210 | 212 |
| Adapter ° C. | 215 | 215 | 216 | 215 |
| Adp Melt ° C. | | 227 | 226 | 226 |
| Filter-Press (MPa) | | 10.3 | 9.0 | 9.7 |
| Adapter-Press (MPa) | | 5.5 | 5.4 | 5.7 |
| Screw R.P.M. | | 100 | 100 | 100 |
| Throughput (g/min) | | 247 | 262 | 244 |

TABLE 2-continued

| Extruder Conditions | Set point | C1 actual | C2 actual | Ex 3 actual |
|---|---|---|---|---|
| Cast Roll-cm/min | 162 | 131 | 162 | 140 |
| Nip Press-MPa | 0.7 | 0.6 | 0.6 | 0.6 |
| $H_2O$ Recirculation Unit Temperature (° C.) | 40 | 39 | 39 | 38 |

The cast sheet samples were used to thermoform shallow trays (depth 3 cm, length 15 cm, width 10 cm) on a model 810/1 Thermoformer made by Sencorp Systems (Hyannis, Mass. 02601). Thermoforming conditions were 190° C. setpoint temperature for the top and bottom oven control zones. Each sheet was preheated for 45 seconds prior to forming using a 25-second vacuum dwell, 20-second platen dwell and a 5-second air eject.

The original 0.76-mm thick cast sheet and the 0.5-mm thick trays were used to measure the haze according to ASTM D1003. The mean Haze value and standard deviation for the mean (based on six replicates) are given in Table 3.

TABLE 3

| Example | Total Energy to Failure (joules) | Haze (%) | |
|---|---|---|---|
| | | 0.5 mm tray | 0.76 mm sheet |
| C1 | 0 | 4 ± 0.4 | 6 ± 0.6 |
| C2 | 0.24 ± 0.1 | 100 ± 0 | 101 ± 0 |
| 3 | 3.6 ± 0.8 | 25 ± 0.4 | 49 ± 0.8 |

In Table 3 there are two measures of haze for each composition. The value at 0.5-mm thickness corresponded to the thermoformed tray and the value at 0.76-mm thickness corresponded to the original cast sheet. The least haze was observed with the Comparative Example C1, the unmodified PLA sheet. The sheet and tray made from Example 3 had somewhat more haze. The relationship between haze and thickness (on sheet or thermoformed part) could be linear assuming no significant crystallization occurred during thermoforming, so less haze could be achieved by forming a thinner part. Less haze could also be achieved by using less of the impact modifier in the PHA composition, provided sufficient toughening was maintained. Comparative Example C2, with a styrene-containing core-shell polymer, provided sheets with very high haze (essentially opaque).

Dynatup impact measurements according to ASTM D3763 on 0.5 mm PLA trays at ambient temperature (23° C.) were also shown in Table 3. In the Dynatup testing a 45-kg dart was used with a 1.27-cm diameter tip. The sample was clamped into place using a 3.2-cm-diameter retaining ring. The dart was dropped from a height of 51 cm to give an initial impact velocity of 3.2 m/sec. Table 3 shows the average and standard deviation in the average based on testing of 3 replicates for Comparative Example C1 and five replicates for Comparative Example C2 and Example 3. In this test method, the total energy to failure in joules was measured; higher numbers illustrated better toughening.

The trays made from 100% PLA-1 (Comparative Example C1) were so brittle that the equipment was unable to measure any significant resistance to the dart as it penetrated the sample. The trays made from Example 3 provided significantly better toughness than the Comparative Examples C1 and C2.

The results in Table 3 illustrate that compositions of PLA modified herein provided improved toughness while providing acceptable clarity.

The invention claimed is:

1. An article produced from a film or sheet wherein
the article is a thermoformed article;
the film or sheet comprises about 90 to about 99.8 weight % of a poly(hydroxyalkanoic acid) composition and about 0.2 to about 10 weight % of an impact modifier, based on the total weight of the poly(hydroxyalkanoic acid) and the modifier; and
the modifier comprises a core/shell polymer that does not comprise a vinyl aromatic comonomer and has a refractive index not greater than 1.5; the core is alkyl acrylate polymer;
the poly(hydroxyalkanoic acid) comprises poly(lactic acid);
the shell comprises polymethyl methacrylate and optionally comprising functional groups including epoxy, carboxylic acid, amine, or combinations of two or more thereof; and
the alkyl acrylate polymer is cross-linked.

2. The article of claim 1 wherein the shell further comprises functional groups including epoxy, carboxylic acid, amine, or combinations of two or more thereof and polymethyl methacrylate is optionally cross-linked.

3. The article of claim 1 wherein the polymethyl methacrylate is cross-linked.

4. The article of claim 1 wherein the alkyl acrylate polymer is polybutyl acrylate.

5. The article of claim 1 being a container.

6. A packaging material comprising or produced from a film or sheet wherein the film or sheet is as recited in claim 1.

7. The packaging of claim 6 wherein the shell further comprises functional groups including epoxy, carboxylic acid, amine, or combinations of two or more thereof and polymethyl methacrylate is optionally cross-linked.

8. The packaging material of claim 6 wherein the polymethyl methacrylate is cross-linked.

9. The packaging material of claim 6 is a lidding film wherein the lidding film, which optionally comprises at least one additional layer comprising or produced from ethylene vinyl acetate copolymer, ethylene acid copolymer or ionomer thereof, polyvinylidene chloride, polyester, polyvinyl alcohol, ethylene vinyl alcohol copolymer, polyamide, aluminum, silicon oxides, aluminum oxides, nonwoven fibrous material, paper, or combinations of two or more thereof.

* * * * *